(12) United States Patent
Menke

(10) Patent No.: US 12,330,878 B2
(45) Date of Patent: Jun. 17, 2025

(54) CURVE CONVEYOR AND USE OF A CONVEYOR MODULE

(71) Applicant: REXNORD FLATTOP EUROPE B.V., s-Gravenzande (NL)

(72) Inventor: Cornelis Hendrik Mijndert Menke, The Hague (NL)

(73) Assignee: REXNORD FLATTOP EUROPE B.V., 's-Gravenzande (NL)

( * ) Notice: Subject to any disclaimer, the term of this patent is extended or adjusted under 35 U.S.C. 154(b) by 10 days.

(21) Appl. No.: 18/285,055

(22) PCT Filed: Mar. 30, 2022

(86) PCT No.: PCT/NL2022/050177
§ 371 (c)(1),
(2) Date: Sep. 29, 2023

(87) PCT Pub. No.: WO2022/211628
PCT Pub. Date: Oct. 6, 2022

(65) Prior Publication Data
US 2024/0174448 A1  May 30, 2024

(30) Foreign Application Priority Data

Apr. 1, 2021 (NL) .................................. 2027908
Oct. 6, 2021 (NL) .................................. 2029328

(51) Int. Cl.
*B65G 15/02* (2006.01)
*B65G 15/12* (2006.01)
(Continued)

(52) U.S. Cl.
CPC ............. *B65G 15/02* (2013.01); *B65G 15/12* (2013.01); *B65G 15/22* (2013.01); *B65G 21/16* (2013.01);
(Continued)

(58) Field of Classification Search
CPC ........ B65G 15/02; B65G 15/12; B65G 15/22; B65G 21/16; B65G 23/06; B65G 23/24;
(Continued)

(56) References Cited

U.S. PATENT DOCUMENTS 1,206,305 A * 11/1916 Cowley .................. B65G 21/14
198/817
3,367,474 A   2/1968 Kerr et al.
(Continued)

FOREIGN PATENT DOCUMENTS

CN   205471124 U   8/2016
CN   211168479 U   8/2020
(Continued)

OTHER PUBLICATIONS

PCT International Search Report and Written Opinion, PCT/NL2022/050177, Jun. 27, 2022, 15 pages.

*Primary Examiner* — Mark A Deuble
(74) *Attorney, Agent, or Firm* — Quarles & Brady LLP

(57) ABSTRACT

Curve conveyor (1), comprising a guiding track extending along a circular arc (2), which guides a conveying part (3) of an endless conveyor (4), the conveying part comprising a plurality of chain strands (5, 6, 7) which with a common center of curvature (C) are spaced apart at an equal radial pitch, and a drive (8) cooperating with the chain strands, which during operation leads the chain strands at a mutually equal angular speed through the guiding track, wherein the chain strands are each built up from a singular series of successive conveyor modules (9) which are each provided at their top with a substantially flat top surface, and wherein the radial pitch between the chain strands substantially corresponds to the radial width of the conveyor modules so that sides of the conveyor modules with enclosure of a narrow gap adjoin and the top surfaces in the conveying part form a substantially uninterrupted conveying surface.

18 Claims, 6 Drawing Sheets

(51) Int. Cl.
*B65G 15/22* (2006.01)
*B65G 21/16* (2006.01)
*B65G 23/06* (2006.01)
*B65G 23/24* (2006.01)
*B65G 23/44* (2006.01)

(52) U.S. Cl.
CPC ............ *B65G 23/06* (2013.01); *B65G 23/24* (2013.01); *B65G 23/44* (2013.01); *B65G 2812/02217* (2013.01)

(58) Field of Classification Search
CPC .......... B65G 23/44; B65G 2812/02217; B65G 17/086
USPC ........................................................ 198/831
See application file for complete search history.

(56) References Cited

U.S. PATENT DOCUMENTS

| | | | | |
|---|---|---|---|---|
| 3,509,984 A | * | 5/1970 | Huffman | B65G 47/2445 198/831 |
| 3,620,355 A | * | 11/1971 | Jones, Jr. | B65G 15/02 198/831 |
| 3,693,780 A | * | 9/1972 | Fraioli, Sr. | B65G 17/086 198/831 |
| 4,179,026 A | * | 12/1979 | de Vries | B65G 21/16 198/840 |
| 5,415,273 A | * | 5/1995 | Peterson | A01D 17/10 198/831 |
| 6,394,261 B1 | * | 5/2002 | DeGennaro | B65G 21/18 198/815 |
| 7,832,549 B2 | * | 11/2010 | Honeycutt | B65G 15/62 198/840 |
| 8,459,444 B2 | * | 6/2013 | Perreard | B65G 21/2072 198/836.4 |
| 2006/0151292 A1 | | 7/2006 | Paquin et al. | |

FOREIGN PATENT DOCUMENTS

| | | |
|---|---|---|
| DE | 102006025520 A1 | 12/2007 |
| NL | 1029294 C2 | 12/2006 |
| WO | 2010130716 A1 | 11/2010 |
| WO | 2018167613 A1 | 9/2018 |
| WO | 2019177455 A1 | 9/2019 |

\* cited by examiner

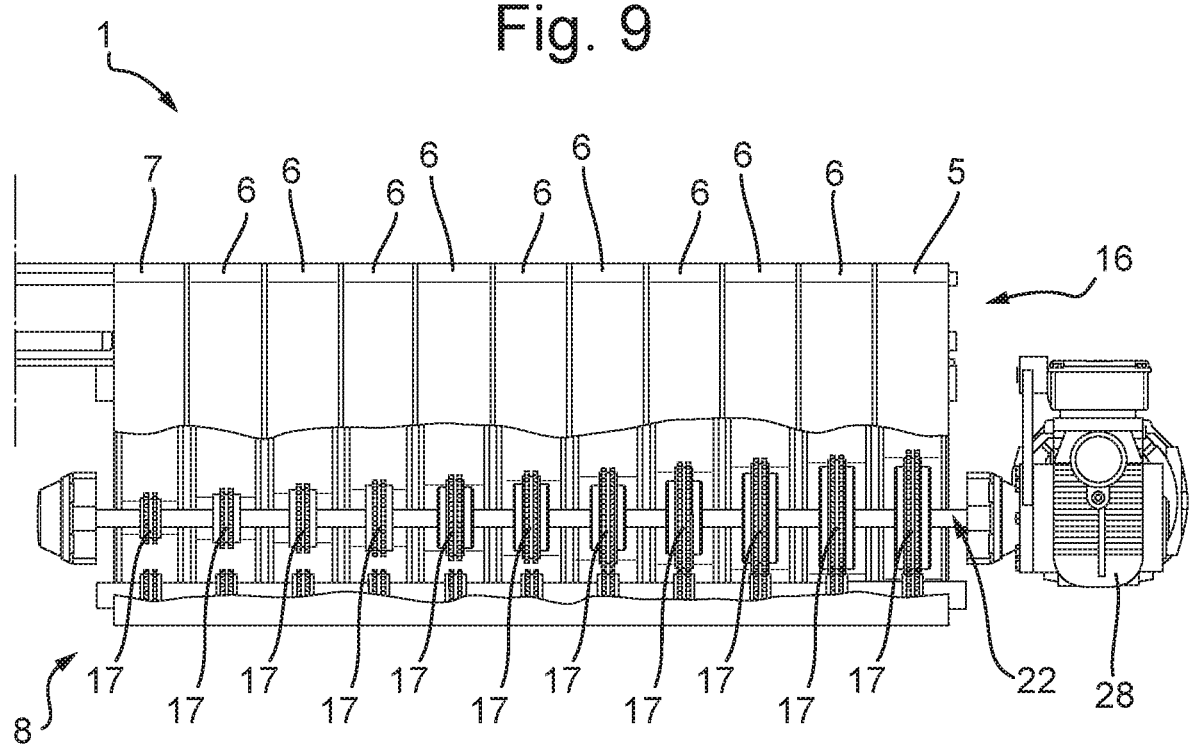
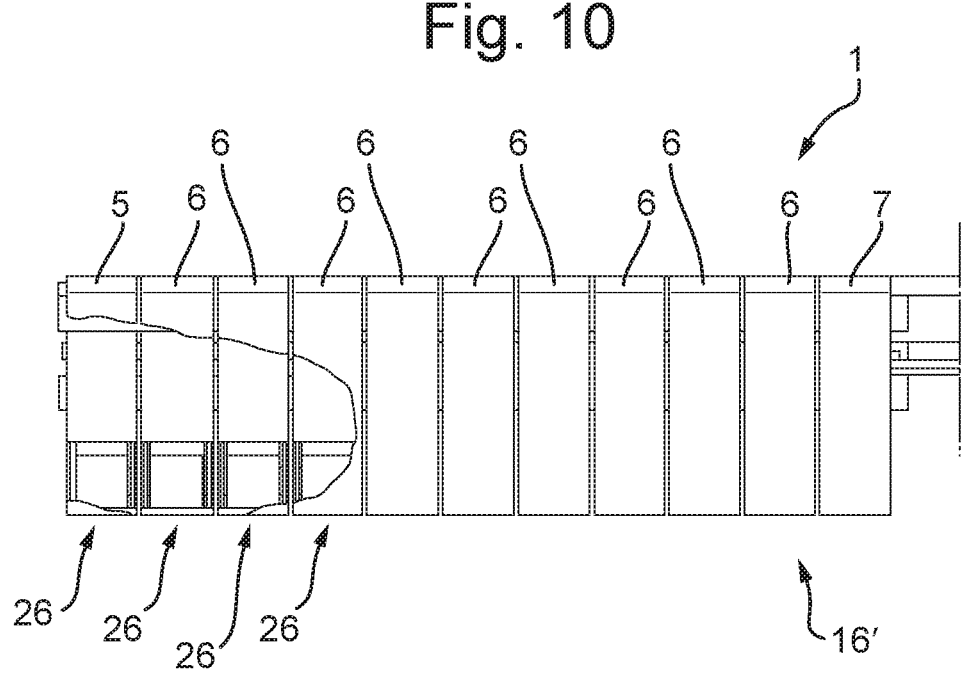

CURVE CONVEYOR AND USE OF A CONVEYOR MODULE

CROSS-REFERENCE TO RELATED APPLICATIONS

This application is a 371 application of PCT/NL2022/050177 filed on Mar. 30, 2022, which claims priority to Netherlands patent application 2027908 filed Apr. 1, 2021 and to Netherlands patent application 2029328 filed Oct. 6, 2021, all of which are incorporated by reference herein in their entirety.

The invention relates to a curve conveyor, comprising a guiding track extending along a circular arc, which guides a conveying part of an endless conveyor. The invention further relates to use of a conveyor module for a modular curve chain in a curve conveyor.

Such curve conveyors are known, and are for instance used when in the context of a manufacturing process discrete products have to pass through a curve in a conveying path, in particular such that their orientation is thereby retained.

A curve conveyor known from practice, of Jonge Poerink, comprises a conveyor which is built up from a series of successive trapezoidal conveyor segments, and which passes around conical wheels. A disadvantage of this construction is that the conveyor segments have a fixed width dimension, so that the curve conveyor lends itself less well for fitting into a standard conveyor system having a stepwise scalable guiding track width. Also, on the outer edge of the conveyor, in rounding, a strong polygon effect occurs, so that products can be transferred less well and/or a dead plate is needed.

From NL1029294 a curve conveyor for baguettes is known, where the conveying part comprises a plurality of chain strands which, with a common center of curvature are spaced apart at an equal radial pitch with a relatively large free interspace, and where a drive cooperating with the chain strands during operation leads the chain strands through the guiding track at a mutually equal angular speed. The chain strands are each implemented as a roller chain which is built up from a singular series of chain links. A disadvantage of this curve conveyor is that it is only suitable for relatively long products oriented in radial direction such as baguettes.

From DE102006025520 a curve conveyor is known, where the conveying part comprises two modular curve mats which with a common center of curvature are spaced apart with enclosure of an arcuate hold-down plate, and wherein a drive, cooperating in the upper part with the bottom sides of the conveyor mats, during operation leads the conveyor mats at mutually equal angular speed through the guiding track. A disadvantage of this curve conveyor is that the products cannot be placed near the center, because upon contact with the hold-down plate standing still relative to the moving conveyor mats, the orientation of products may be lost.

The invention contemplates a curve conveyor with which disadvantages mentioned can be counteracted. To this end, the invention provides a curve conveyor, comprising a guiding track extending along a circular arc, which guides a conveying part of an endless conveyor, the conveying part comprising a plurality of chain strands which with a common center of curvature are spaced apart at an equal radial pitch, and a drive cooperating with the chain strands, which during operation leads the chain strands at a mutually equal angular speed through the guiding track, wherein the chain strands are each built up from a series of successive conveyor modules which are each provided at their top with a substantially flat top surface, and wherein the radial pitch between the chain strands substantially corresponds to the radial width of the conveyor modules so that sides of the conveyor modules with enclosure of a narrow gap adjoin and the top surfaces in the conveying part form a substantially uninterrupted conveying surface. By providing the curve conveyor with conveyor modules having a substantially flat top surface whose radial width corresponds to the radial pitch between the chain strands so that the sides of the conveyor modules closely adjoin and the top surfaces form a continuous conveying surface, a curve conveyor can be obtained whose entire surface is available for supporting products, and whose width is stepwise scalable with a minor polygon effect.

Within this context, a narrow gap is to be understood to be a free interspace of less than 10% of the radial pitch between the chain strands, in particular having a radial width of approximately 0.5-5 mm, more particularly approximately 1-2 mm.

The conveying surface formed with the top surfaces in the conveying part is preferably flat, in particular lying or horizontally positioned, hence in particular a horizontal flat conveying surface. Top surfaces or the conveying surface can be at least partly open, by use of through holes in the top surface and/or by locally leaving free space between edges of the top surfaces of conveyor modules successive in conveying direction. Thus, the conveying surface may for instance be passable for approximately 20-80%.

The length of the circular arc along which the conveyor track extends can be freely chosen, and may for instance correspond to an angular segment of for instance approximately 30°-270°, in particular approximately 60°-240°, more particularly approximately 90°-210°, for instance approximately 120°-180°. It will be clear that the angular segment mentioned will be less than 360° when the conveying surface is horizontal and flat. This in contrast to, for instance, a spiral guiding track having an inclined conveying surface.

The guiding track extends preferably solely along the circular arc mentioned, that is, the guiding track is preferably free of any part, for instance a straight part, that deviates from the circular arc. It will be clear that the chain strands may then nonetheless, outside the guiding track, extend possibly straightly, for instance at the location of an optionally straight track part which is further explained elsewhere herein, and which extends outside the preferably flat horizontal conveying surface.

By building up the chain strands of the conveyor from mutually identical conveyor modules, the construction can, if so desired, be further simplified. The pitch of the conveyor modules successive in conveying direction in the chain strand is preferably less than 2 inches, and is in particular approximately 0.5 inch. It is noted that such conveyor modules are known per se, and are marketed by applicant, among others.

Transversely to the conveying direction, the conveyor modules preferably have a width of approximately 83 mm or approximately 2.92 inches, and the radial pitch between the chain strands is preferably approximately 85 mm or approximately 3 inches. Thus, the width of chain strands can correspond to the standard metric and Imperial dimensioning as used in the conveyor industry, so that the curve conveyor is stepwise scalable within the standard. Also, mat modules and chain modules already available in these standard sizes may be used for the chain strands, track guiding elements, sprocket wheels, etc. It is noted that within this context also a singular series of successive conveyor mat modules is taken to be a chain strand.

Advantageously, successive conveyor modules can pivot relative to each other about a pivoting axis extending transversely to the top surface between an aligned position in which the successive conveyor modules can follow a straight path and a pivoted position in which successive conveyor modules can follow a curved path. Especially owing to the possibility that successive conveyor modules can also follow a straight path, more freedom of construction is obtained in the return guiding of the conveyor, and the drive can be simplified. Preferably, the successive conveyor modules can be pivoted from the aligned position both to the left and to the right in two directions. The conveyor modules then form a modular curve chain, also referred to as 'side flexing chain'.

The curve conveyor may comprise a return guiding track extending under the guiding track along an equal circular arc, the return guiding track guiding a part of a return part of the endless conveyor, with the drive engaging a straight track part of the return part, extending between the guide and the return guide. By providing such a straight track part located between the guiding track and the return guiding track, the drive can be considerably simplified. The drive can then, for instance, comprise a series of sprocket wheels spaced apart at the radial pitch mentioned, which sprocket wheels by way of circumferentially located, radially outwardly directed driving teeth thereof engage in driving provisions, located under the top surfaces, of the conveyor modules of the chain strands. Such a straight part elegantly extends at least partly in a standing orientation, i.e., with a direction component transverse to the plane of the guiding track greater than a direction component along the plane of the guiding track, and is preferably located adjacent the beginning and/or end of the curved guiding track. To save space, the straight track part may further be executed in an at least partly lying orientation, i.e., with a direction component along the plane of the guiding track greater than a direction component transverse to the plane of the guiding track. Thus, the straight track part can be located at least partly under the guiding track, and possibly between the guiding track and the return guiding track. For a compact rounding of the chain strands of the endless conveyor, the guiding track may at a beginning and/or end thereof be provided with a nose-over.

By driving the sprocket wheels centrally in a transmission ratio which may or may not be different, a simple and operationally reliable drive can be realized. Provision may then for instance be made for a common driving shaft which is driven with a single motor. A non-differing, that is, equal transmission ratio, for instance by means of a direct drive by a common driving shaft, may for instance be used when the sprocket wheels have a greater working diameter according as the respective chain strand is located further outwardly relative to the common center of curvature, as is further explained elsewhere herein.

It will be clear that the pitch between the driving teeth of such a sprocket wheel preferably corresponds to a pitch in conveying direction between the conveyor modules of the respective chain strand. If the conveyor modules of the different chain strands are advantageously mutually identical as has been mentioned elsewhere herein, the above-mentioned pitch in conveying direction will hence be equal for the different chain strands.

The chain strands can advantageously be located each at a distance from the center of curvature that corresponds to an integer multiple of the radial pitch between the chain strands. Successive chain strands can then be driven in a mutual transmission ratio that corresponds to the ratio of distance of the respective chain strands to the center of curvature of the guiding track.

By driving the sprocket wheels from a common driving shaft each via a separate endless driving element, a relatively compact transmission can be realized. When the endless driving element is a toothed belt which cooperates with toothed belt wheels which are coupled with the sprocket wheel and the central driving shaft respectively, the transmission for the different sprocket wheels in the proper mutual ratios can be realized with standard components, and compactness can be further augmented. Alternatively, the endless driving element can for instance be a vee belt.

As an alternative to an endless driving element, the sprocket wheels may for instance be driven from the common driving shaft via a respective gear transmission. Such a gear transmission can then, with gears meshing with each other, provide a desired transmission ratio between the driving shaft and the respective sprocket wheel. Such a gear transmission can for instance be realized using a box or cassette of gears. Also possible, for that matter, are combinations of the options for transmission mentioned herein.

In a particularly advantageous embodiment, the sprocket wheels can have a greater working diameter according as the respective chain strand is located further outwardly relative to the common center of curvature. The ratios between the working diameters of the sprocket wheels then preferably correspond to the ratios of the distance of the respective chain strands to the center of curvature of the guiding track. The sprocket wheels can then for instance be driven from a common driving shaft directly, so that no intermediate driving element or intermediate transmission is necessary. That is to say: each of the sprocket wheels is connected directly with the same common driving shaft, and each of the sprocket wheels engages the respective chain strand directly. Thus, the chain strands can be driven in a particularly robust and compact manner, while nonetheless a mutually equal angular speed of the chain strands through the guiding track is enabled. Having regard to the equal pitch in conveying direction for the different chain strands, discussed elsewhere herein, it will be clear that the tooth numbers of the respective sprocket wheels in this case are greater according as their working diameter is greater. Thus, the tooth numbers of the sprocket wheels preferably correspond to the radial distance of the respective chain strand to the common center of curvature. When the chain strands, as mentioned elsewhere herein, are each located at a distance from the center of curvature that corresponds to an integer multiple of the radial pitch between the chain strands, configurations can be simply found where the tooth number of each of the sprocket wheels is a whole number, for instance by successively calculating the resulting tooth numbers on the basis of a number of acceptable radial distances of the inner chain strand to the center of curvature and a given radial pitch between the chain strands, until a distance has been found that results in whole numbers of teeth. Heretofore there was in this technical field a prejudice that the inner chain strand always had to be positioned at a distance of 500 mm to the center of curvature, which previously, to a large extent, hindered the highly useful insight set out above being gained.

Thus, particularly advantageously, the curve conveyor can be dimensioned as desired using universal components such as identical conveyor modules and standard sprocket wheels, and at the same time be particularly compact and have a very robust drive. More complex solutions as with different especially configured conveyor modules per chain strand, or with more complex drives, are thereby made superfluous. Moreover, the curve conveyor can provide a relatively high-grade conveying surface, in particular with good, even connections to upstream and downstream conveyors.

When the return part between the drive and an entry part of the return guiding track is provided with a tensioning loop, in particular a tensioning loop energized with a weight, entry of the chain strands of the conveyor into the return guiding track can be made easier, and relatively simply the tension on the conveyor can be regulated.

The invention also relates to the use of a conveyor module for a modular curve chain in a curve conveyor according to any one of the configurations as discussed hereinbefore.

The conveyor module can then comprise a body part extending transversely to a conveying direction and having a top surface which bounds the body part at a top, and a bottom surface which bounds the body part at an underside, and can furthermore comprise a hinge provision with which successive conveyor modules can be hingedly coupled using hinge pins extending transversely to the conveying direction.

The chain strand can then comprise a series of conveyor modules successive in a conveying direction, wherein hinge provisions of successive conveyor modules are coupled with the aid of hinge pins extending transversely to the conveying direction, so that successive modules can pivot relative to each other about an axis which is located in or along the conveying surface and which extends substantially transversely to the conveying direction, and wherein the hinge pins are received in the hinge provisions with play, so that successive modules can furthermore pivot relative to each other about an axis which extends substantially transversely to the conveying surface.

Regarding the disclosure made herein, it is noted that the above-mentioned technical features, whether or not included in a dependent claim, can also each in itself be used to advantage, and if desired can also be used in any combinations in a curve conveyor and/or a use or method associated therewith.

The invention will be further explained on the basis of a non-limiting exemplary embodiment which is represented in a drawing. In the drawing:

FIG. 8 shows a further partial side view of the curve conveyor of

Figure 6:
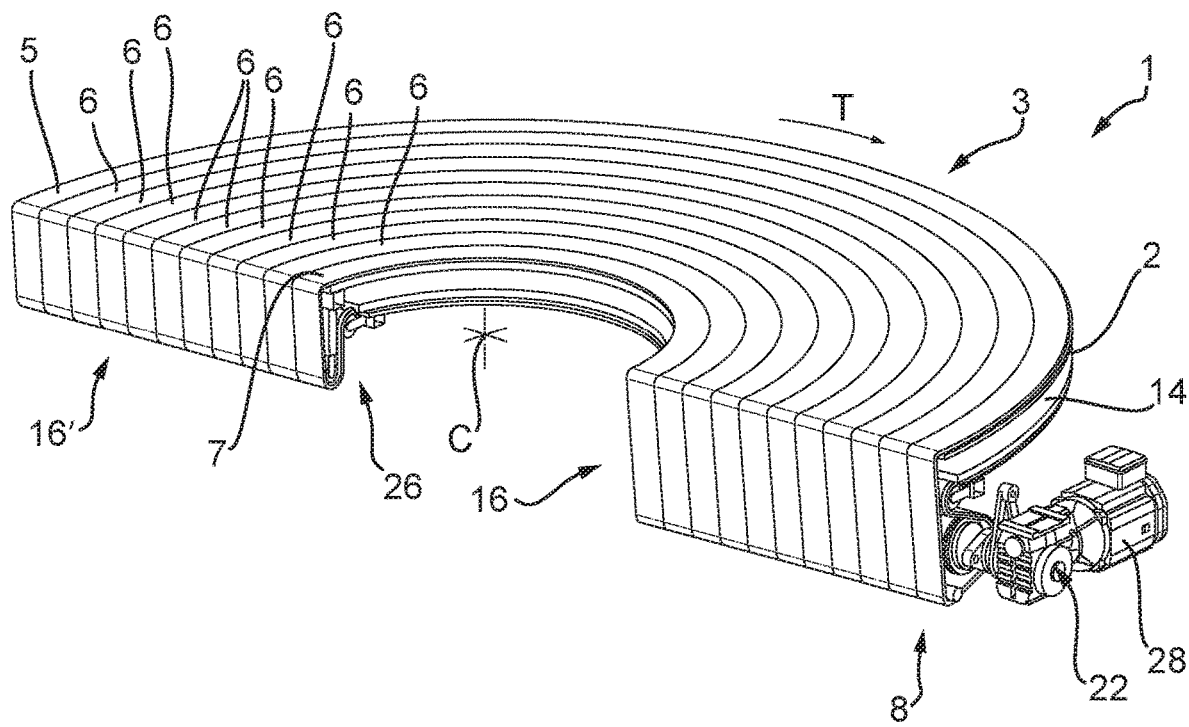
FIG. 6 shows a schematic perspective view of a further curve conveyor.
Figure 7:
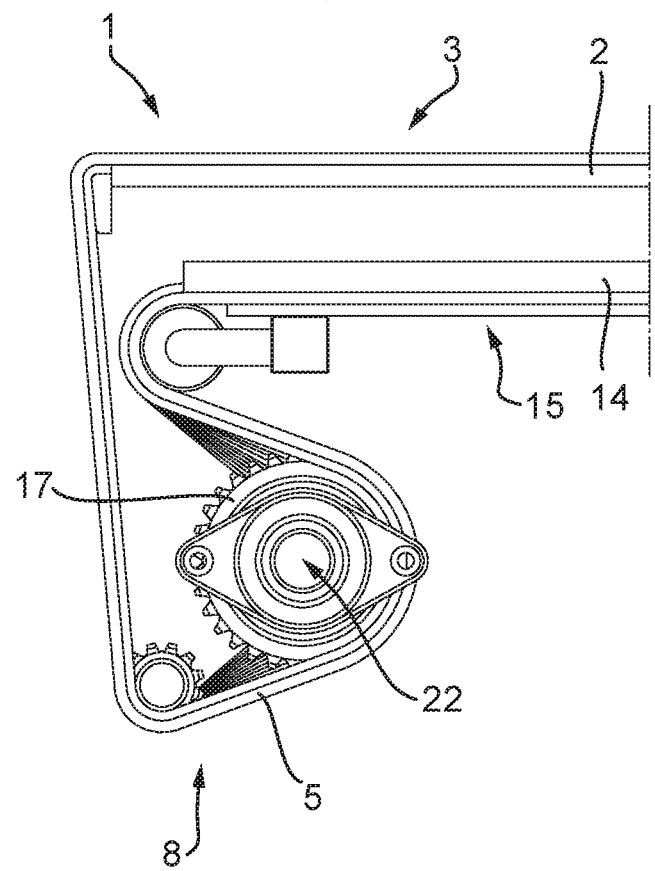
FIG. 7 shows a partial side view of the curve conveyor of FIG. 6, where a driving motor shown in FIG. 6 is not shown.

FIGS. 6 and 7, namely from an opposite side compared to FIG. 7; and

Figure 8:
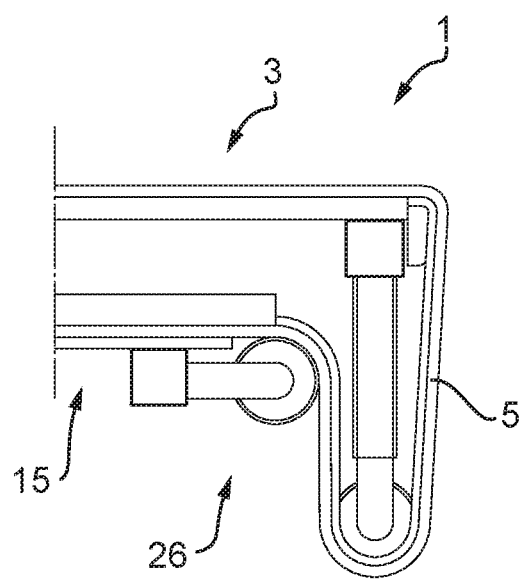

FIGS. 9 and 10 each show a partially cutaway partial front view of the curve conveyor of FIGS. 6-8.

It is noted that the figures are only schematic representations of examples of preferred embodiments of the invention. In the figures, like or corresponding parts are indicated with the same reference numerals. For simplicity of the drawing, in some instances, of a plurality of like or corresponding elements only one or a few of those elements have been provided with a respective reference numeral.

Figure 1:
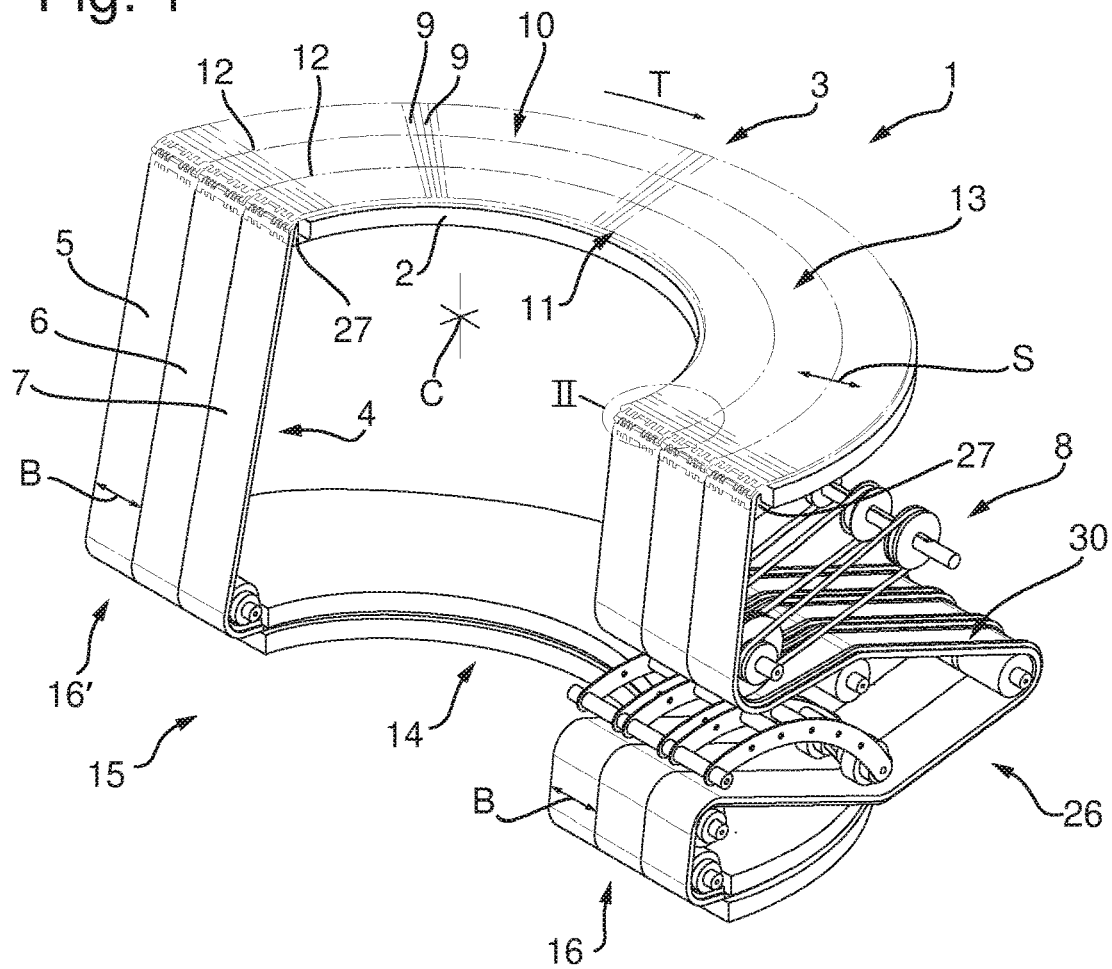
FIG. 1 shows a schematic perspective view of a curve conveyor.
Figure 2:
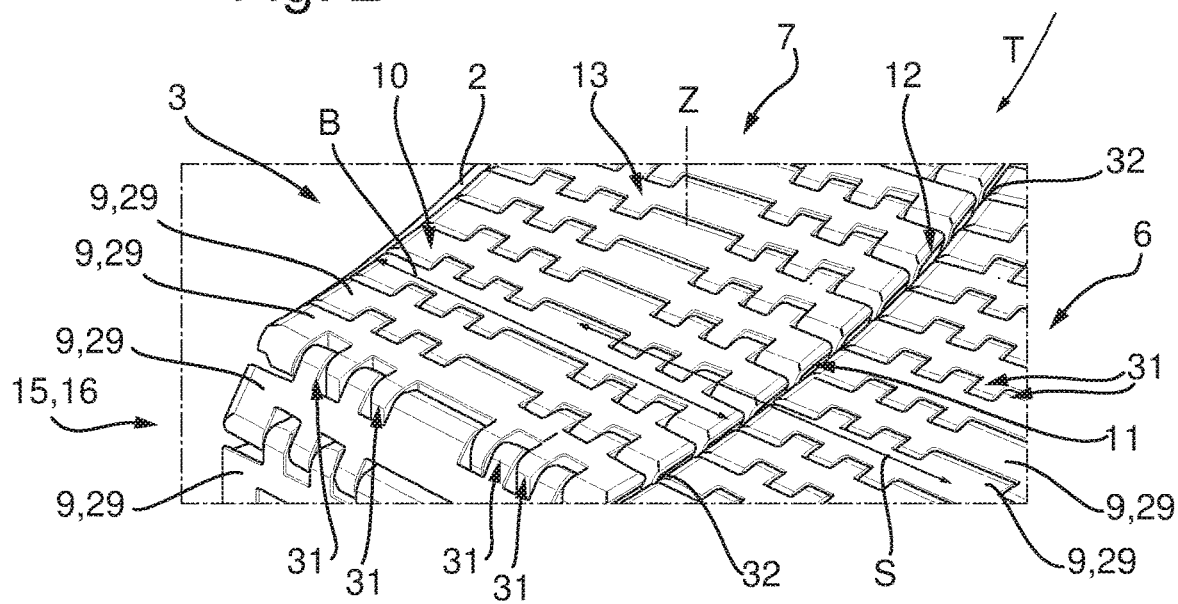
FIG. 2 shows an enlarged view at a somewhat different angle of view, of detail II in FIG. 1.
Figure 3:
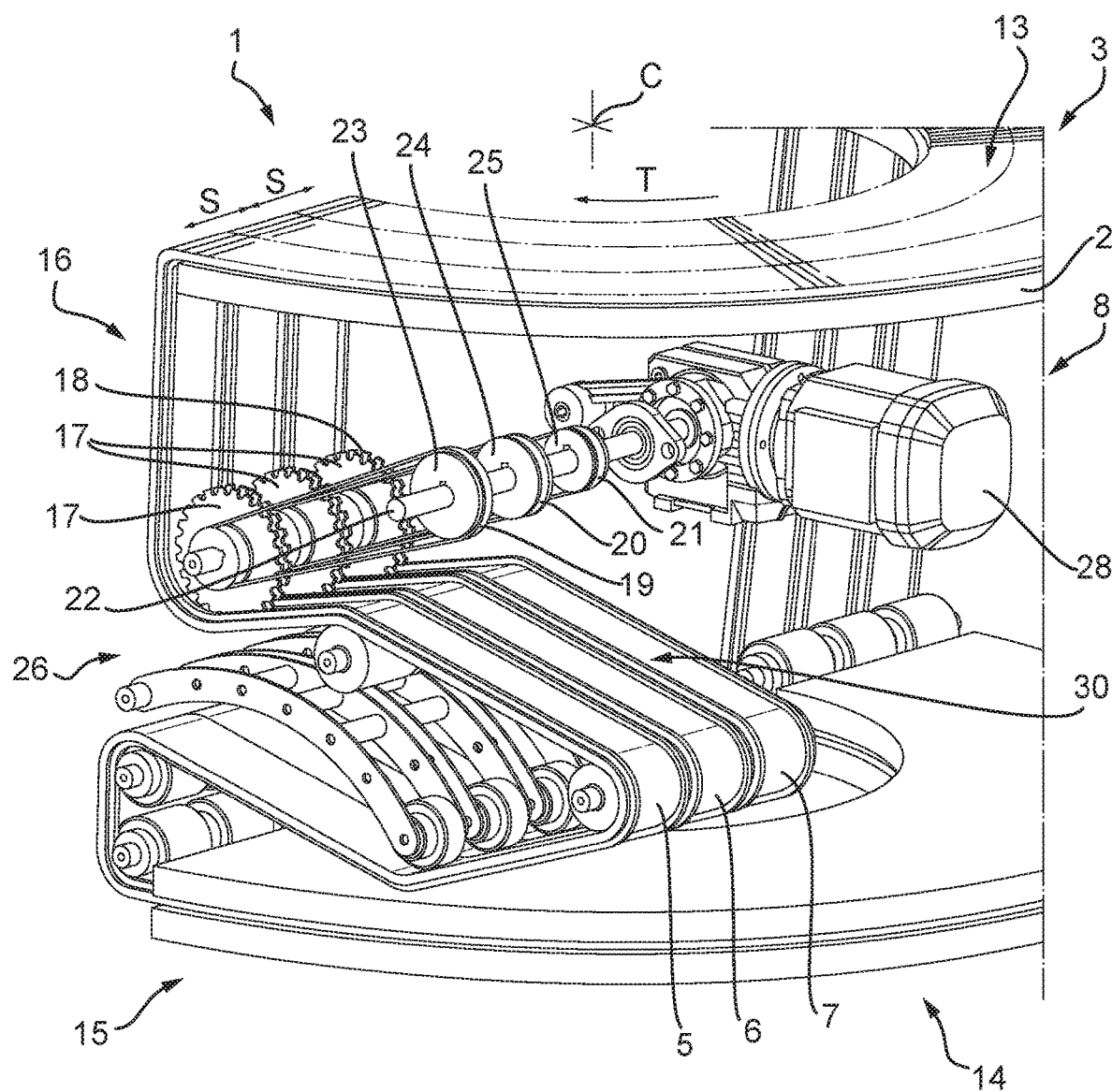
FIG. 3 shows a further schematic perspective view of the curve conveyor of FIG. 1, in which compared to FIG. 1 additionally a motor of a drive is shown.

FIGS. 1-3 show an exemplary embodiment of a curve conveyor 1.

The curve conveyor 1 comprises a guiding track 2 extending along a circular arc, which guides a conveying part 3 of an endless conveyor 4. The conveying part 3 comprises a plurality of chain strands 5, 6, 7, which with a common center of curvature C are spaced apart at an equal radial pitch S.

The conveying part 3 further comprises a drive 8 cooperating with the chain strands 5, 6, 7, which during operation leads the chain strands 5, 6, 7 at a mutually equal angular speed through the guiding track 2.

The drive 8 of this exemplary embodiment can be seen in detail in FIG. 3, in which as part of the drive 8 inter alia a driving motor 28 is shown, which for simplicity of the drawing is not shown in FIGS. 1 and 2. Further details concerning the drive 8 are explained elsewhere in this description.

The chain strands 5, 6, 7 in this exemplary embodiment are each built up from a singular series of successive conveyor modules 9, which are each at their top provided with a substantially flat top surface 10. Because of the singularity of the series, the width of each chain strand 5, 6, 7 is equal to the radial width B of one conveyor module 9, and within the chain strand 5, 6, 7, transversely to the conveying direction T, there are no conveyor modules 9 placed next to each other. The radial pitch S between the chain strands 5, 6, 7 substantially corresponds to the radial width B of the conveyor modules 9, so that sides 11 of the conveyor modules adjoin with enclosure of a narrow gap 12, and the top surfaces 10 in the conveying part 3 form a substantially uninterrupted conveying surface 13.

In the example shown, the chain strands 5, 6, 7 outside the conveying part 3, via a return part 15, run on endlessly as a component of the endless conveyor 4. While the continuous modular build-up of the chain strands 5, 6, 7 for simplicity of the drawing is not explicitly drawn in the return part 15 in FIGS. 1 and 3, it will be clear that the conveyor modules 9 are nonetheless present there in the strands 5, 6, 7 throughout the endless conveyor 4.

In the detailed representation of FIG. 2 it can be seen how a singular series of linked conveyor modules 9 form an endless chain strand 7 which extends continuously along the conveying part 3 and then proceeds along the return part 15, in particular along a straight track part 16 and return guiding track 14 thereof, hereinafter to be discussed in more detail. In the conveying part 3, the conveyor modules 9 are pivoted relative to each other around a pivoting axis Z, so as to follow the curvature of the guiding track 2, as is further explained elsewhere in this description.

The narrow gap 12 here concerns a free interspace of less than 10% of the radial pitch S between the chain strands 5, 6, 7, in particular approximately 1.5 mm.

The conveying surface 13 formed with the top surfaces 10 in the conveying part 3 is flat here, in particular lying or horizontally positioned.

The length of the circular arc along which the guiding track 2 extends is here approximately 180°, but this length can be chosen substantially freely, in particular depending on a desired conveying path. For a more complex conveying path it is for instance possible to set up a plurality of curve conveyors 1 in conveying direction T behind one another, whether or not directly after each other, or with straight or other conveying path sections therebetween, so that for instance a slalom path can be realized to by-pass objects already present in the factory, such as machines and supporting pillars.

In the exemplary embodiment shown, successive conveyor modules 9 can pivot relative to each other about a pivoting axis Z (see FIG. 2) extending transversely to the top surface 10 between an aligned position in which the successive conveyor modules 9 can follow a straight path and a pivoted position in which successive conveyor modules 9 can follow a curved path.

In FIG. 2, for simplicity of the drawing, as an example only one pivoting axis Z is indicated for one respective pair of successive conveyor modules 9, but it will be clear that such a pivoting axis is present in a corresponding manner between each pair of successive conveyor modules 9. The pivoting axis Z thus extends in each case for instance halfway the width B upon a mutual engagement between the successive conveyor modules 9, perpendicular to the conveying surface 13. By way of example, the successive pivoting movements in the chain strand 7 in the conveying part 3 can be seen in FIG. 2, where the respective conveyor modules 9 on the radial inner side of the guiding track 2, due to the pivoting movements, are arranged closer together than on the radial outer side. In FIG. 2 it can further be seen that, upon transition to a straight track part 16 of the return part 15 directly following the conveying part 3 in conveying direction T, the earlier closer arrangement can change into an arrangement of the conveyor modules 9 that is substantially uniform across the width B, so that the chain strand 7 can follow the straight track part 16.

The successive conveyor modules 9 can here, from the aligned position, be pivoted both to the left and to the right in two directions. The mutually linked conveyor modules 9 thereby form a modular curve chain, known per se, also called side flexing chain.

In this exemplary embodiment, the chain strands 5, 6, 7 of the conveyor 4 are built up from mutually identical conveyor modules 9. Thus, the different chain strands 5, 6, 7 here comprise more conveyor modules 9 according as the respective chain strand 5, 6, 7 is located radially more outwardly in the conveying part 3.

The pitch of the conveyor modules 9 successive in conveying direction T in the chain strand 5, 6, 7 is here approximately 0.5 inch.

In this exemplary embodiment, the conveyor modules 9 have a width B of approximately 83 mm, and the radial pitch S between the chain strands 5, 6, 7 is approximately 85 mm. In a variant for the U.S. market the conveyor modules 9 have a width B of approximately 2.92 inches, and the radial pitch is approximately 3 inches.

The conveyor module 9 comprises in the example shown a body part 29 extending transversely to a conveying direction T, having a top surface 10 which bounds the body part 29 at a top, and a bottom surface 30 which bounds the body part 29 at a bottom. The top surface 10 forms a supporting surface for supporting products, and—when the conveyor module 9 is in the conveying part 3—is part of the conveying surface 13. The bottom surface 30 forms a supporting surface for supporting the body part 29 on the guiding track 2.

The conveyor module 9 is here furthermore provided with a hinge provision 31, with which successive conveyor modules 9 can be hingedly coupled using hinge pins 32 extending transversely to the conveying direction T. In a chain strand 5, 6, 7 the hinge provisions 31 of successive conveyor modules 9 are mutually coupled using hinge pins 32 extending transversely to the conveying direction T, so that successive modules 9 in each case can pivot relative to each other about an axis which is located in or along the conveying surface 13 and which extends substantially transversely to the conveying direction T. This allows the chain strand 5, 6, 7 to be diverted, for instance around a sprocket wheel 17 or nose-over 27. The hinge pins 32 are further received in the hinge provisions 31 with play, so that successive modules 9 can furthermore pivot relative to each other about an axis Z which extends substantially transversely to the conveying surface 13. This allows the chain strand 5, 6, 7 to pass through a bend in the conveying surface 13. The conveyor module 9 is provided at the bottom surface 30 thereof with a recess (not explicitly shown) for therein receiving a tooth 18 of a driving gearwheel 17.

In this exemplary embodiment, the conveyor module 9 is implemented as a so-called conveyor mat module 9. In conveyor mat modules, the body part 29, for the purpose of the hinge provision 31, is provided at front and rear sides as viewed in the conveying direction T, with a series of coupling parts and receiving spaces alternately successive transversely to the conveying direction T. Coupling parts and receiving spaces of conveyor mat modules 9 successive in conveying direction T can then interdigitate, as can be seen in FIG. 2. Successive conveyor mat modules 9 may be hingedly coupled using hinge pins 32 extending transversely to the conveying direction T and reaching through hinge holes in the coupling parts. When with the conveyor mat modules 9 a singular row of successive modules 9 is formed into a chain strand 5, 6, 7, the length of the hinge pin 32 is usually virtually equal to the width B of the body part 29 transverse to the conveying direction T.

In this exemplary embodiment, the chain strands 5, 6, 7 are each located at a distance from the center of curvature C that corresponds to an integer multiple of the pitch S between the chain strands 5, 6, 7.

In this exemplary embodiment, the curve conveyor 1 comprises furthermore a return guiding track 14, extending under the guiding track 2 along an equal circular arc, which guides a part of a return part 15 of the endless conveyor 4, wherein the drive 8 engages a straight track part 16 of the return part 15, extending between the guiding track 2 and the return guiding track 14.

In the drawings, a preferred conveying direction T is indicated, which can be realized by a corresponding driving direction in the drive 8. In the conveying direction T shown, the conveying part 3 in this example is advantageously subjected substantially to tensile loading by the drive 8. In some embodiments, it is nonetheless possible to choose a different, in particular opposite, conveying direction, or even to alternate the conveying direction as desired. To this end, then, for instance a switchable and/or further drive may be provided.

In this exemplary embodiment, the drive 8 comprises a series of sprocket wheels 17 (see FIG. 3) spaced apart at the radial pitch S, which, by circumferentially located, radially outwardly directed driving teeth 18 thereof, engage in drive provisions (not explicitly shown) located under the top surfaces 10, of the conveyor modules 9 of the chain strands 5, 6, 7.

The straight track part 16 in this exemplary embodiment extends at least partly in standing orientation, i.e., with a direction component transverse to the plane of the guiding track 2 greater than a direction component along the plane of the guiding track 2, and is here located directly at the end (in conveying direction T) of the curved guiding track 2. To save space, the straight track part 16 is further executed in partly lying orientation, i.e., with a direction component along the plane of the guiding track 2 greater than a direction component transverse to the plane of the guiding track 2. Thus, the straight track part 16 is here located at least partly under the guiding track 2, in particular between the guiding track 2 and the return guiding track 14. At that location, in this example, a tensioning loop 26 is provided, which is further explained elsewhere in this description.

A further straight track part 16' extends in this example in conveying direction T between an end of the return guiding track 14 and a beginning of the guiding track 2. Possibly, as an alternative or an addition, at the location of the further straight track part 16', a drive and/or tensioning loop may be provided, as is further explained elsewhere herein.

In this exemplary embodiment, the sprocket wheels 17 are centrally driven in a mutually different transmission ratio. To this end, in this example, a common driving shaft 22 is provided which can be driven with one motor 28 (see FIG. 3).

In this exemplary embodiment, successive chain strands 5, 6, 7 are driven in a mutual transmission ratio which corresponds to the ratio of distance of the respective chain strands 5, 6, 7 to the center of curvature C of the guiding track 2.

In this exemplary embodiment, the chain strands 5, 6, 7 are each driven from a common driving shaft 22 via a separate endless driving element 19, 20, 21.

In this exemplary embodiment, the endless driving element 19, 20, 21 is a toothed belt, which cooperates with toothed belt wheels 23, 24, 25 which are coupled with, respectively, the sprocket wheel 17 and the central driving shaft 22.

In FIG. 3 it can be seen that the respective toothed belt wheels 23, 24, 25 and toothed belts 19, 20, 21 of the chain strands 5, 6, 7 have mutually different dimensions, to thereby achieve mutually different linear driving speeds with a common driving shaft 22, such that the respective angular speeds in the conveying part 3 are substantially mutually equal. In the table below, a calculation is shown for a curve conveyor having a conveyor which is composed of ten chain strands, respectively received in tracks r1-r10 of a guiding track:

| track | r to center track (mm) | Ratio of speed | ratio in whole tooth numbers | | ratio in wheels toothed belt | |
|---|---|---|---|---|---|---|
| r1 | 340 | — | — | — | — | — |
| r2 | 425 | 1.250 | 5 | 4 | 25 | 20 |
| r3 | 510 | 1.200 | 6 | 5 | 24 | 20 |
| r4 | 595 | 1.167 | 7 | 6 | 25 | 24 |
| r5 | 680 | 1.143 | 8 | 7 | 24 | 21 |
| r6 | 765 | 1.125 | 9 | 8 | 27 | 24 |
| r7 | 850 | 1.111 | 10 | 9 | 30 | 27 |
| r8 | 935 | 1.100 | 11 | 10 | 22 | 20 |
| r9 | 1020 | 1.091 | 12 | 11 | 24 | 22 |
| r10 | 1105 | 1.083 | 13 | 12 | 26 | 24 |

Pitch chain tracks 85 mm min. 20 teeth max. 30 teeth

In the exemplary embodiment shown in FIGS. 1-3 the chain strands 7, 6, 5 correspond to tracks r1, r2 and r3, respectively.

In this exemplary embodiment, the return part 15 is provided, between the drive 8 and an entry part of the return guiding track 14, with a tensioning loop 26, in particular a tensioning loop 26 energized with a weight.

In this exemplary embodiment, the guiding track 2 is provided, at a beginning and/or end thereof, with a nose-over 27 for diverting the endless conveyor 4.

Thus, a conveyor module 9 for a modular curve chain can be used in a curve conveyor 1.

Figure 4:
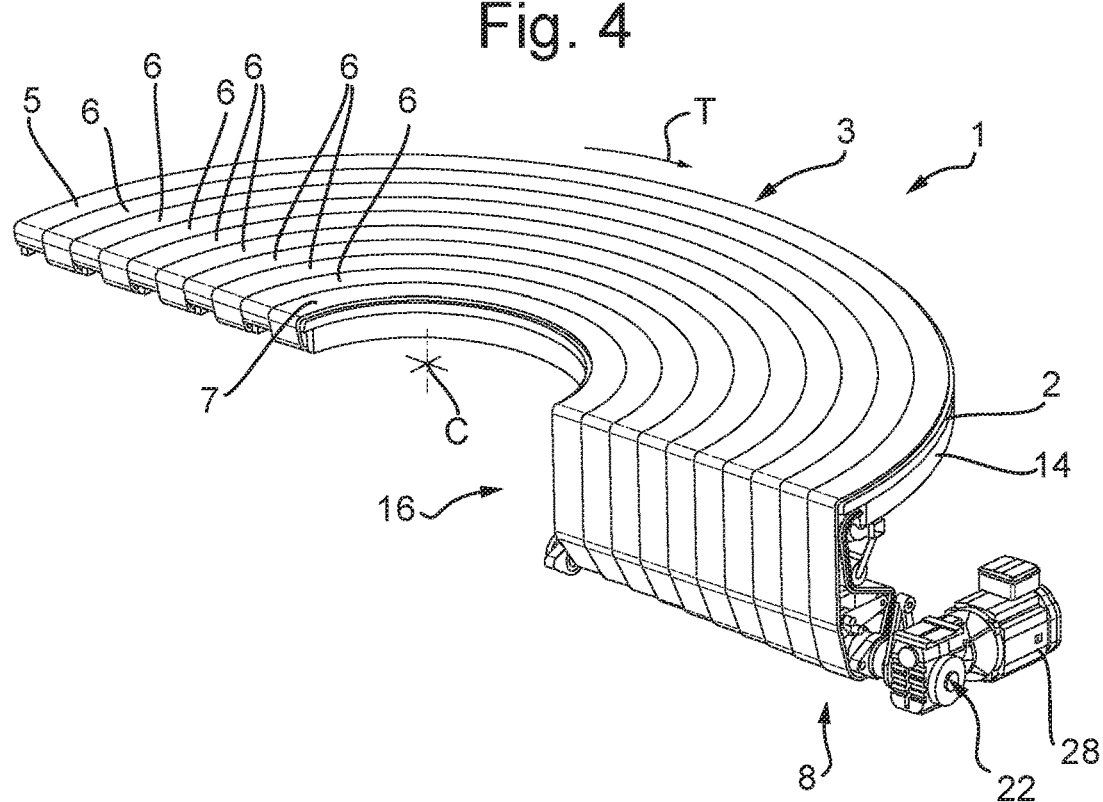
FIG. 4 shows a schematic perspective view of a further curve conveyor.
Figure 5:
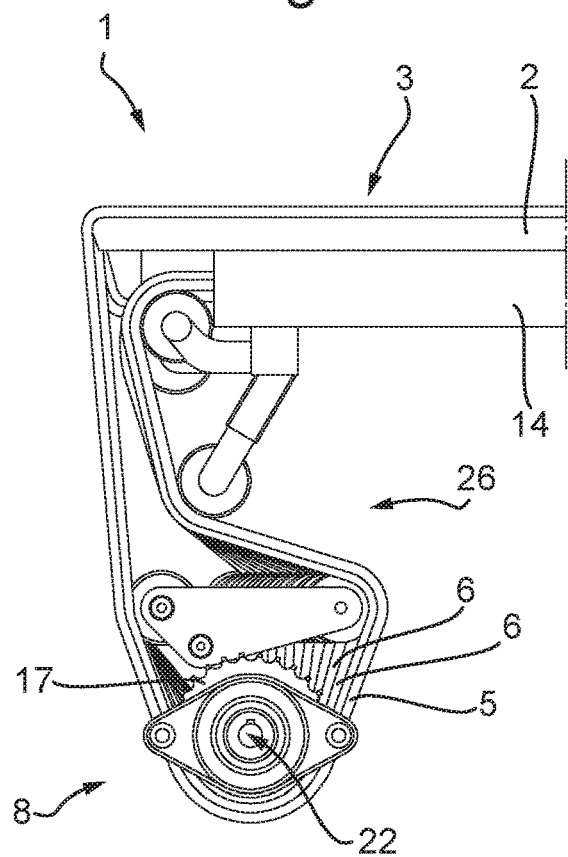
FIG. 5 shows a partial side view of the curve conveyor of FIG. 4, where a driving motor shown in FIG. 4 is not shown.

FIGS. 4 and 5 show a further exemplary embodiment of a curve conveyor 1. Insofar as not specified otherwise herein, the curve conveyor 1 of FIGS. 4-5 may for instance be configured according to the above described curve conveyor of FIGS. 1-3 and/or according to one or more above described alternatives and/or supplements.

FIGS. 4 and 5 show an example of a particularly advantageous embodiment where the sprocket wheels 17 are connected directly with the driving shaft 22, and where the sprocket wheels 17 have a greater working diameter and correspondingly greater tooth numbers according as the respective chain strand 5, 6, 7 is located further outwards relative to the common center of curvature C.

In FIG. 5 a sprocket wheel 17 of the outermost chain strand 5 can be seen, where the sprocket wheels of the further chain strands 6, 7 in the view of FIG. 5 are located behind the sprocket wheel 17 shown, and where the sprocket wheels have a progressively smaller respective working diameter and tooth number according as they are located more rearwards in the view of FIG. 5. In FIG. 4, in the portion under the straight track part 16, it can be seen that the chain strands 5, 6, 7 there conform to the different working diameters of the respective sprocket wheels 17.

The ratios between the working diameters (also: tooth numbers) of the sprocket wheels 17 correspond to the ratios of distance of the respective chain strands 5, 6, 7 to the center of curvature C of the guiding track 2.

When the distance of the innermost chain strand 7 to the center C, by way of sample calculation, is set to be 1, the successively adjacent chain strands 6 and 5 could for instance have the following respective distances to center C: 1.2; 1.4; 1.6; 1.8; 2.0; 2.2; 2.4; 2.6; 2.8. The respective working diameters and tooth numbers of the sprocket wheels 17 then correlate preferably correspondingly. That is, when the sprocket wheel of the innermost chain strand 7 has for instance a working diameter of 10, the working diameters of successively adjacent chain strands 6 and 5 are preferably as follows: 12; 14; 16; 18; 20; 22; 24; 26; 28. The tooth numbers of the respective sprocket wheels correspond for instance to the working diameters mentioned or to corresponding multiples or fractions thereof, such that each sprocket wheel has a whole tooth number. It will be clear that the distances and diameters mentioned only concern a sample calculation and that many variants with many different dimensions are possible within the above-mentioned advantageous principle of corresponding ratios.

As can be seen in FIGS. 4 and 5, the sprocket wheels 17, because of their thus-differing working diameters, can be driven directly from the common driving shaft 22, in particular without intermediate driving element or intermediate transmission such as an endless driving element or a gearwheel cassette.

In the example of FIGS. 4 and 5, the return guiding track 14 is located closely under the guiding track 2, due to which a particularly compact curve conveyor 1 is provided. It will be clear, however, that the above-described sprocket wheels with different working diameters can also be used in combination with a differently placed return guiding track, for instance a return guiding track 14 as shown in FIGS. 1-3.

In the example of FIGS. 4 and 5, a greater number of chain strands 5, 6, 7 can be seen than in the example of FIGS. 1-3. It will be clear, however, that the number of chain strands can be substantially chosen as desired and that the chosen number of chain strands need not depend on the configuration of the drive 8 or vice versa. Likewise, it will be clear that the number of chain strands need not depend on the positioning of the return guiding track 14 or vice versa.

FIGS. 6-10 show a further exemplary embodiment of a curve conveyor 1, viz., a variant on the above discussed exemplary embodiment of FIGS. 4-5.

In the likewise highly advantageous variant of FIGS. 6-10, for each chain strand 5, 6, 7 a respective tensioning loop 26 is provided, as can be properly seen in FIG. 10. Due to each strand having its own tensioning loop 26, each strand can be kept properly tensioned individually. The tensioning loops 26 are here provided at the other straight track part 16' vis-à-vis the drive 8 at straight track part 16. In consequence, the curve conveyor 1 can on the side of the drive 8 be particularly compact, that is, even more than in the variant of FIGS. 4-5.

In FIG. 9 it can be properly seen that, just as in the variant of FIGS. 4-5, the working diameters and tooth numbers of the sprocket wheels 17 correspond to the radial distance of the respective chain strand 5, 6, 7 to the center of curvature C, which in the view of FIG. 9 is to the left of the drawing (see FIG. 6). As has been explained elsewhere herein, thus a particularly versatile, compact and robust curve conveyor can be provided, using universal conveyor modules and standard driving elements including standard sprocket wheels. It will be clear that the number of chain strands 5,6,7 can be chosen substantially as desired, while for the distance of the innermost strand 7 to the center of curvature C it can be simply calculated for a number of options within an acceptable range what the resultant tooth numbers of the sprocket wheels would amount to, until an option is found that results in whole tooth numbers. The skilled person who has the benefit of the current disclosure will see directly how such calculations can be performed in an efficient and effective manner, for instance using a spreadsheet program, so that the improved curve conveyor can therewith be dimensioned as desired.

The invention is not limited to the exemplary embodiments represented here.

Thus, a drive and/or a tensioning loop may for instance extend wholly or partly outside a footprint of the guiding track, for instance beyond an end of the guiding track or the return guiding track.

Also, the conveyor modules may alternatively be implemented as conveyor chain modules. In conveyor chain modules, the body part, for the purpose of the hinge provision, is provided with a connecting block included centrally under the body part and provided at the front and rear with hinge eyes. The hinge eyes of the connecting blocks at the front and rear sides of successive conveyor chain modules can be aligned, and be coupled using hinge pins extending transversely to the conveying direction. The length of the hinge pins is then usually less than the width of the body part transverse to the conveying direction. The hinge pins are received in the hinge provisions with play, so that successive modules can pivot relative to each other about an axis extending substantially transverse to the conveying surface. The body part is provided at the front with two protrusions with a recess located therebetween, and provided at the rear with a protrusion, shaped to correspond to the recess, along with adjacent recesses. The protrusions and recesses of chain modules successive in conveying direction then interdigitate.

Such variants will be clear to the skilled person and are understood to be within the scope of the invention as defined in the following claims.

REFERENCE NUMERALS

1. Curve conveyor
2. Guiding track
3. Conveying part
4. Endless conveyor
5, 6, 7. Chain strands
8. Drive
9. Conveyor module
10. Top surface of conveyor module
11. Side of conveyor module
12. Narrow gap
13. Conveying surface
14. Return guiding track
15. Return part
16, 16'. Straight track part of return part
17. Sprocket wheel
18. Driving tooth
19, 20, 21. Endless driving element
22. Driving shaft
23, 24, 25. Toothed belt wheel
26. Tensioning loop
27. Nose-over
28. Driving motor
29. Body part of conveyor module
30. Bottom surface of conveyor module
31. Hinge provision
32. Hinge pin
B. Width of conveyor module
C. Center of curvature
S. Radial pitch
T. Conveying direction
Z. Pivoting axis of successive conveyor modules

The invention claimed is:

1. A curve conveyor, comprising a guiding track extending along a circular arc, which guides a conveying part of an endless conveyor, the conveying part comprising a plurality of chain strands which with a common center of curvature are spaced apart at an equal radial pitch, and a drive cooperating with the chain strands, which during operation leads the chain strands at a mutually equal angular speed through the guiding track, wherein the chain strands are each built up from a singular series of successive conveyor modules which are each provided at their top with a substantially flat top surface, and wherein the radial pitch between the chain strands substantially corresponds to the radial width of the conveyor modules so that sides of the conveyor modules enclose a narrow gap between adjoining sides of the conveyor modules and the top surfaces in the conveying part form a substantially uninterrupted conveying surface, wherein the chain strands are each located at a distance from the center of curvature that corresponds to an integer multiple of the pitch between the chain strands.

2. The curve conveyor according to claim 1, wherein successive conveyor modules can pivot relative to each other about a pivoting axis extending transversely to the top surface between an aligned position in which the successive conveyor modules can follow a straight path and a pivoted position in which successive conveyor modules can follow a curved path.

3. The curve conveyor according to claim 1, wherein the chain strands of the conveyor are built up from mutually identical conveyor modules.

4. The curve conveyor according to claim 1, wherein the conveyor modules have a width of approximately 83 mm or approximately 2.92 inches, and the radial pitch between the chain strands is approximately 85 mm or approximately 3 inches, respectively.

5. The curve conveyor according to claim 1, wherein the drive comprises a series of sprocket wheels spaced apart at said radial pitch, which sprocket wheels by way of circumferentially located, radially outwardly directed driving teeth thereof engage under the top surfaces of the conveyor modules of the chain strands.

6. The curve conveyor according to claim 5, wherein the sprocket wheels are centrally driven in a mutually different or non-different transmission ratio.

7. The curve conveyor according to claim 5, wherein the sprocket wheels have a greater working diameter according as the respective chain strand is located further outwards relative to the common center of curvature.

8. The curve conveyor according to claim 7, wherein the sprocket wheels are driven from a common driving shaft directly, without an intermediate driving element or an intermediate transmission.

9. The curve conveyor according to claim 8, wherein the circular arc along which the conveyor track extends corresponds to an angular segment of approximately 30°-270°.

10. The curve conveyor according to claim 1, wherein successive chain strands are driven in a mutual transmission ratio that corresponds to the ratio of the distance of the respective chain strands to the center of curvature of the guiding track.

11. The curve conveyor according to claim 1, wherein the return part between the drive and an entry part of the return guiding track is provided with a tensioning loop.

12. The curve conveyor according to claim 1, wherein the guiding track adjacent a beginning and/or end thereof is provided with a nose-over for diverting the endless conveyor.

13. Use of a conveyor module for a modular curve chain in a curve conveyor according to claim 1, wherein the conveyor module comprises a body part extending transversely to a conveying direction having a top surface which bounds the body part at a top, and a bottom surface which bounds the body part at a bottom, and a hinge provision with which successive conveyor modules can be hingedly coupled using hinge pins extending transversely to the conveying direction.

14. The curve conveyor according to claim 1, wherein the circular arc along which the conveyor track extends corresponds to an angular segment of approximately 30°-270°.

15. The curve conveyor according to claim 14, wherein the circular arc along which the conveyor track extends corresponds to an angular segment of approximately 120°-180°.

16. A curve conveyor, comprising a guiding track extending along a circular arc, which guides a conveying part of an endless conveyor, the conveying part comprising a plurality of chain strands which with a common center of curvature are spaced apart at an equal radial pitch, and a drive cooperating with the chain strands, which during operation leads the chain strands at a mutually equal angular speed through the guiding track, wherein the chain strands are each built up from a singular series of successive conveyor modules which are each provided at their top with a substantially flat top surface, and wherein the radial pitch between the chain strands substantially corresponds to the radial width of the conveyor modules so that sides of the conveyor modules enclose a narrow gap between adjoining sides of the conveyor modules and the top surfaces in the conveying part form a substantially uninterrupted conveying surface, wherein the curve conveyor further comprises a return guiding track extending under the guiding track along an equal circular arc, which guides a part of a return part of the endless conveyor, wherein the drive engages a straight track part of the return part, extending between guiding and the return guide.

17. A curve conveyor, comprising a guiding track extending along a circular arc, which guides a conveying part of an endless conveyor, the conveying part comprising a plurality of chain strands which with a common center of curvature are spaced apart at an equal radial pitch, and a drive cooperating with the chain strands, which during operation leads the chain strands at a mutually equal angular speed through the guiding track, wherein the chain strands are each built up from a singular series of successive conveyor modules which are each provided at their top with a substantially flat top surface, and wherein the radial pitch between the chain strands substantially corresponds to the radial width of the conveyor modules so that sides of the conveyor modules enclose a narrow gap between adjoining sides of the conveyor modules and the top surfaces in the conveying part form a substantially uninterrupted conveying surface, wherein the drive comprises a series of sprocket wheels spaced apart at said radial pitch, which sprocket wheels by way of circumferentially located, radially outwardly directed driving teeth thereof engage under the top surfaces of the conveyor modules of the chain strands, wherein the sprocket wheels are each driven from a common driving shaft via a separate endless driving element.

18. The curve conveyor according to claim 17, wherein the endless driving element is a toothed belt, which cooperates with toothed belt wheels which are coupled with respectively the sprocket wheel and the central driving shaft.

* * * * *